US008231241B2

(12) United States Patent
Hopkins

(10) Patent No.: US 8,231,241 B2
(45) Date of Patent: Jul. 31, 2012

(54) SELF-LEVELING BRACKET FOR LIGHTING FIXTURE

(75) Inventor: Larry D. Hopkins, Oklahoma City, OK (US)

(73) Assignee: Larry D. Hopkins, Trustee, Oklahoma City, OK (US)

( * ) Notice: Subject to any disclaimer, the term of this patent is extended or adjusted under 35 U.S.C. 154(b) by 309 days.

(21) Appl. No.: 12/423,579

(22) Filed: Apr. 14, 2009

(65) Prior Publication Data

US 2010/0259944 A1 Oct. 14, 2010

(51) Int. Cl.

| | |
|---|---|
| ***F21V 21/00*** | (2006.01) |
| ***F21V 11/00*** | (2006.01) |
| ***B60Q 1/00*** | (2006.01) |
| ***B60Q 3/00*** | (2006.01) |
| ***F21S 8/06*** | (2006.01) |

(52) U.S. Cl. .............. 362/217.16; 362/217.14; 362/370; 362/404

(58) Field of Classification Search .................. 362/404, 362/217.14, 217.15, 217.16, 249.1, 249.11, 362/147, 370, 225, 217, 1, 217.1, 217.11, 362/217.12, 368, 371; 248/202.1, 291.1, 248/201, 339, 340, 341, 317, 323, 324, 342, 248/343, 325, 276.1, 284.1

See application file for complete search history.

(56) References Cited

U.S. PATENT DOCUMENTS

| | | | | |
|---|---|---|---|---|
| 2,335,218 | A * | 11/1943 | Vacha | 362/221 |
| 2,641,433 | A * | 6/1953 | Wright | 248/343 |
| 2,740,885 | A * | 4/1956 | Kruger | 362/220 |
| 2,937,841 | A * | 5/1960 | Bodian | 248/324 |
| 2,951,716 | A * | 9/1960 | Myers | 285/273 |
| 3,452,957 | A * | 7/1969 | Zuelsdorf | 248/318 |
| 4,964,606 | A * | 10/1990 | Beam et al. | 248/333 |
| 5,111,370 | A * | 5/1992 | Clark | 362/147 |
| 6,299,327 | B1 * | 10/2001 | Camarota | 362/219 |
| 7,445,188 | B2 * | 11/2008 | Lamparter | 248/326 |
| 7,500,762 | B2 * | 3/2009 | Kassay et al. | 362/225 |
| 7,988,342 | B2 * | 8/2011 | Pahl | 362/391 |
| 2008/0112172 | A1 * | 5/2008 | Pahl | 362/370 |
| 2008/0308700 | A1 * | 12/2008 | Wei et al. | 248/326 |

* cited by examiner

*Primary Examiner* — David Crowe

(74) *Attorney, Agent, or Firm* — Dunlap Codding, P.C.

(57) ABSTRACT

A self-leveling bracket assembly for suspending a lighting fixture from a ceiling of a structure. The light fixture comprising a frame having a first and second ends, the self-leveling bracket assembly having two brackets, each bracket comprising a connector member adapted to be attached to the ceiling and a hangar having one end pivotally attached to the connector member and another end adapted to receive the light fixture.

15 Claims, 4 Drawing Sheets

SELF-LEVELING BRACKET FOR LIGHTING FIXTURE

BACKGROUND OF THE INVENTION

1. Field of the Invention

This invention relates to a self-leveling bracket, and more particularly, but not by way of limitation, to a self-leveling bracket for use with lighting fixtures, namely high intensity fluorescent lighting assemblies.

2. Brief Description of Related Art

High intensity fluorescent lighting, or "HIF lights" are relatively new in the art. HIF lights are provided for producing intense light in a small area and are considered "point sources" of lighting. HIF lights are popular in applications that feature large expanses lit by distant fixtures, such as indoor and outdoor sports facilities, factories and warehouses with high ceilings. HIF lights are beginning to replace high intensity discharge lighting, or "HID lamps" for a variety of reasons, namely HIF lights do not require long warm-up times of traditional HID lamps. Also, HIF lights are quieter and do not produce light flicker when operated. For these reasons, HIF lights are replacing HID lamps in many applications.

Most fluorescent lighting used in industrial applications requires the use of long glass tubes filled with a gas. Typically, fluorescent lighting fixtures comprise a rectangular frame that is adapted to receive one or more of the glass tubes within sockets that are connectable to an electrical energy source. As each of the glass tubes is typically four feet in length and each frame may hold multiple glass tubes, the lighting fixtures can be cumbersome to handle and install. For example, most fluorescent lighting fixtures will have a width of two feet and a length of four feet, therefore, installation is can be particularly challenging. In most cases, the fluorescent lighting fixtures are installed by suspending the fluorescent lighting fixtures from cables that hang from the ceiling of a structure. Additionally, the fluorescent lighting fixtures may be installed by securely strapping the fluorescent lighting fixtures to a structural beam of the ceiling of a structure. This method of installation is undesirable as the positioning of the fluorescent lighting fixtures depend upon the slope of the ceiling such that if the ceiling is angled, the fluorescent lighting fixtures will project light at an angle rather than directly downward.

Therefore, a need exists for a self-leveling bracket for securing fluorescent lighting fixtures, the self-leveling bracket allowing the fluorescent lighting fixture to self adjust such that the lighting fixture is oriented substantially parallel to the ground. It is to such a self-leveling bracket that the present invention is directed.

BRIEF DESCRIPTION OF THE SEVERAL VIEWS OF THE DRAWINGS

FIG. 6 is an exploded perspective view of the self-leveling bracket shown in combination with an extension member and a lighting fixture.

DETAILED DESCRIPTION OF EXEMPLARY EMBODIMENT

Figure 1:
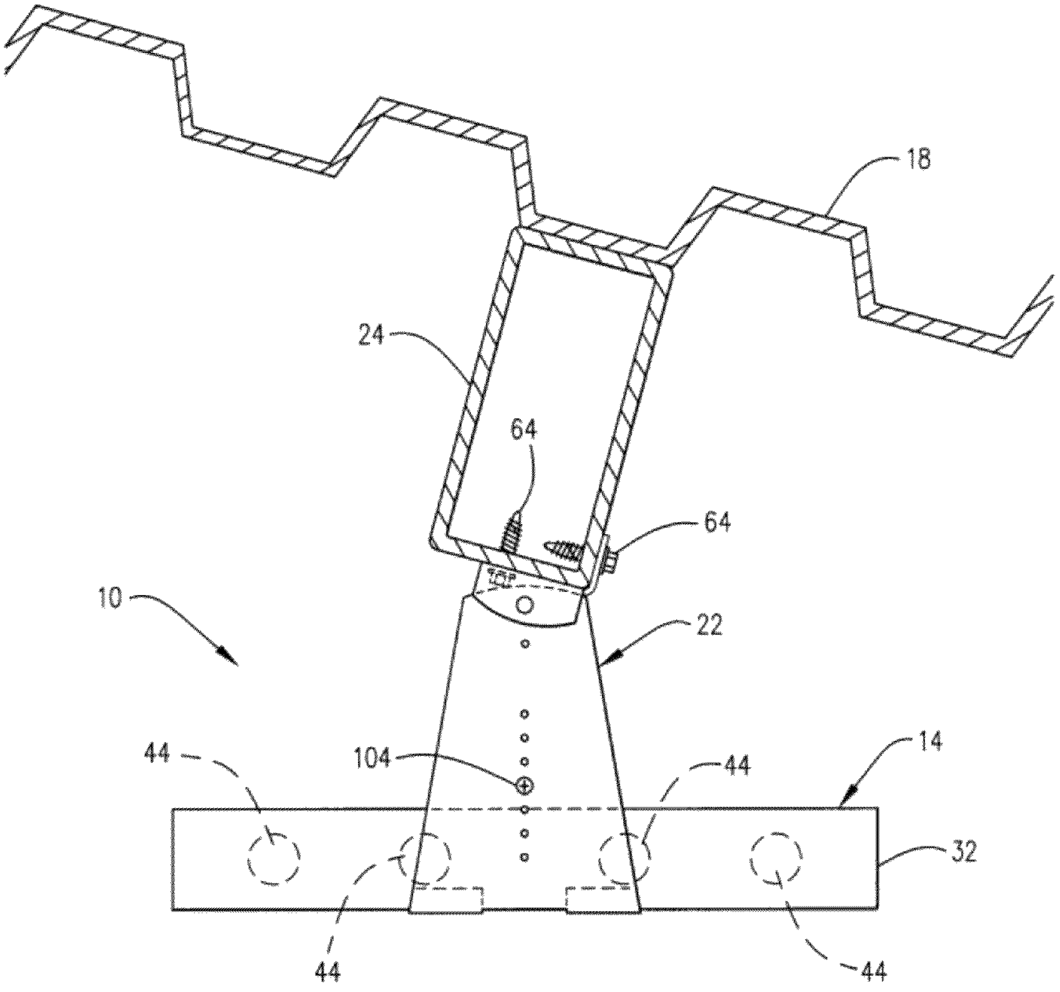
FIG. 1 is an end view of a self-leveling bracket constructed in accordance with the present invention shown connected to a support beam of a ceiling for securing a fluorescent lighting fixture.
Figure 2:
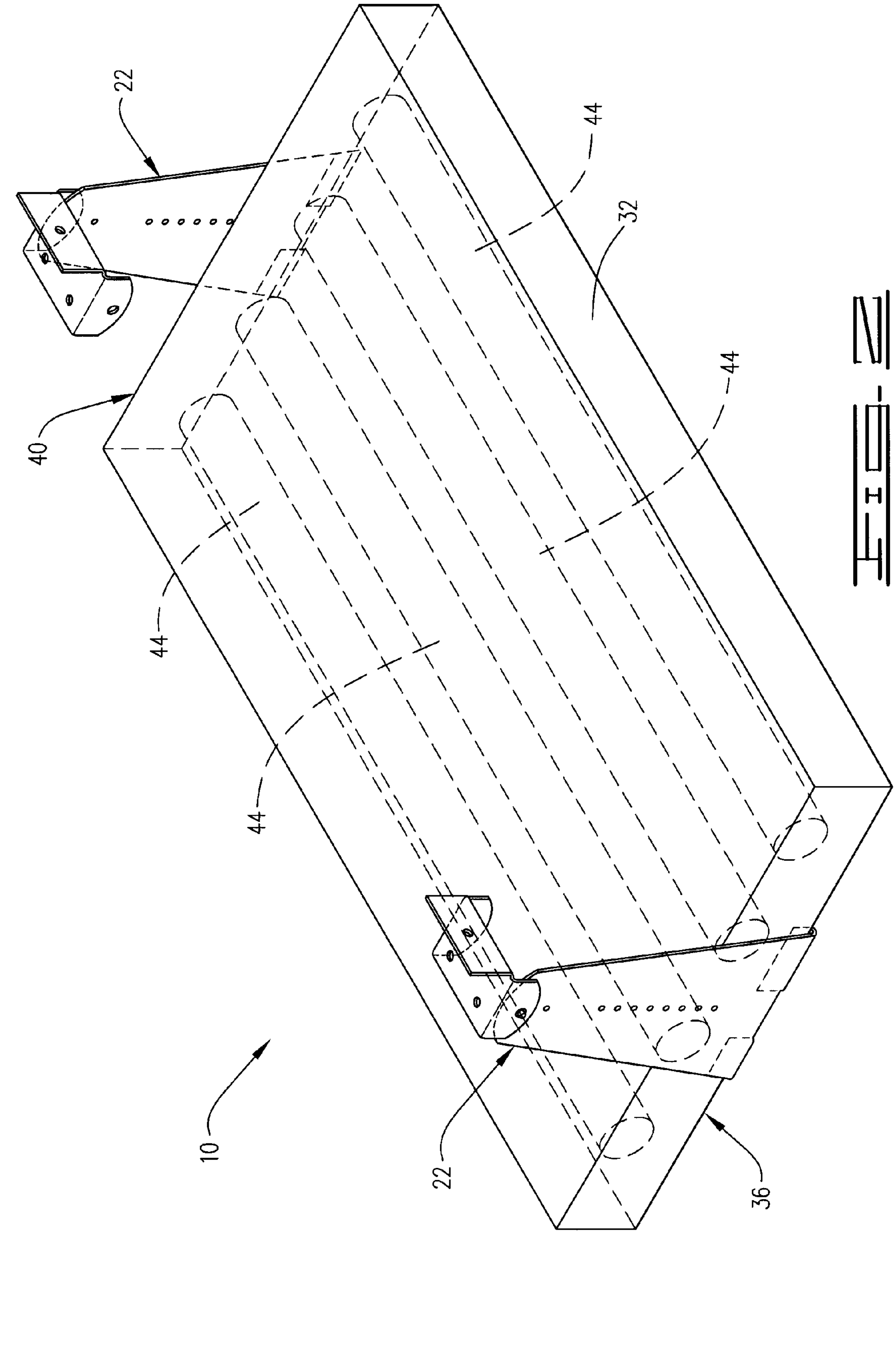
FIG. 2 is a perspective view of the self-leveling bracket assembly in combination with the lighting fixture.

Referring now to the drawings and, more particularly to FIGS. 1 and 2 collectively, shown therein is a self-leveling bracket assembly, hereinafter referred to as the bracket assembly 10, in combination with a fluorescent lighting fixture 14. The bracket assembly 10 is connectable to a ceiling 18 of a structure, and more specifically to a support beam 24 of the ceiling 18. The support beam 24 is typically fabricated of steal, but may be fabricated on other material, such as concrete. The bracket assembly 10 is constructed in such a way that when connected to the lighting fixture 14, the lighting fixture 14 may self-level so that the lighting fixture 14 is disposed substantially parallel to the ground of the structure when the ground is level.

The lighting fixture 14 is provided with a substantially rectangular frame 32 having a first end 36 and a second end 40 and a length extending therebetween. Although the lighting fixture 14 has been disclosed as having a substantially rectangular frame 32, any number of other shapes and/or configurations of lighting fixtures 14 which would be known to one of ordinary skill in the art with the present disclosure before them are likewise contemplated for use in accordance with the present invention. The lighting fixture 14 also includes one or more fluorescent tube lights 44 in electrical connection with an electrical connector (not shown) for connecting the lighting fixture 14 to the electrical system of the structure.

The bracket assembly 10 may include two brackets 22. The two brackets 22 are constructed identically to one another. For purposes of clarity, the construction of only one of the brackets 22 will be described hereinafter. The bracket 22 may be constructed from a strong and rigid material such as a metal (such as steel, titanium, aluminum or blends thereof), although any number of materials, for example, a resin or plastic polymer, natural material(s) such as a wood or fiber based material and combinations thereof, that would be known to one of ordinary skill in the art with the present disclosure before them are likewise contemplated for use in accordance with the present invention. The bracket 22 may be fabricated using any number of different manufacturing processes, the selection of which may be controlled, in part, by the material selected.

Figure 3:
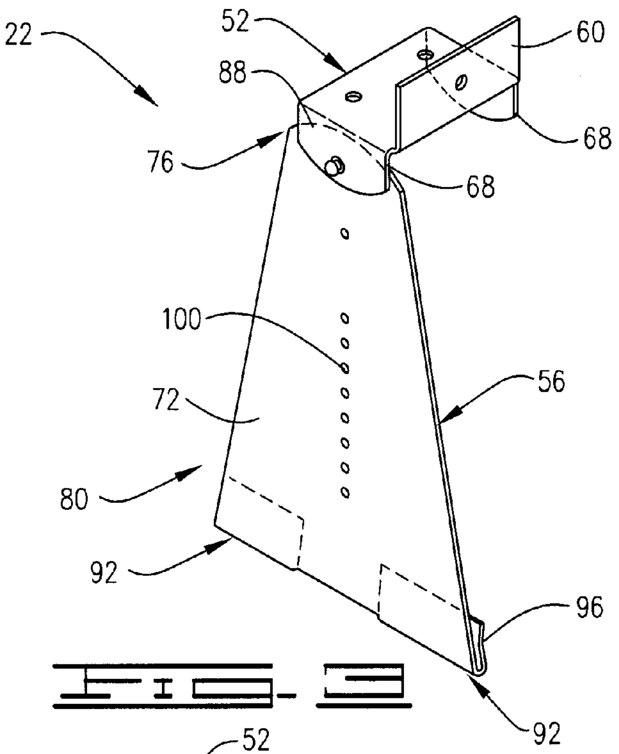
FIG. 3 is a perspective view of the sel-level bracket
Figure 4:
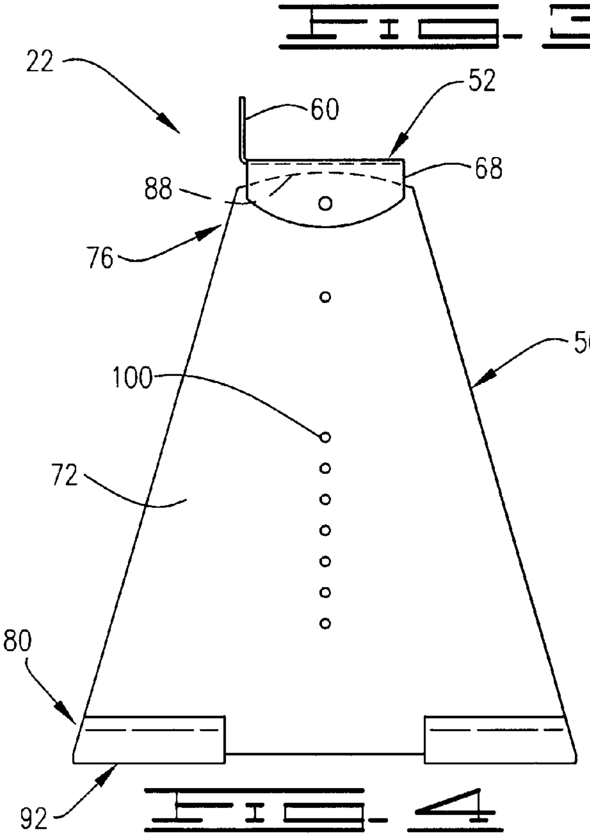
FIG. 4 is an end view of the self-leveling bracket.
Figure 5:
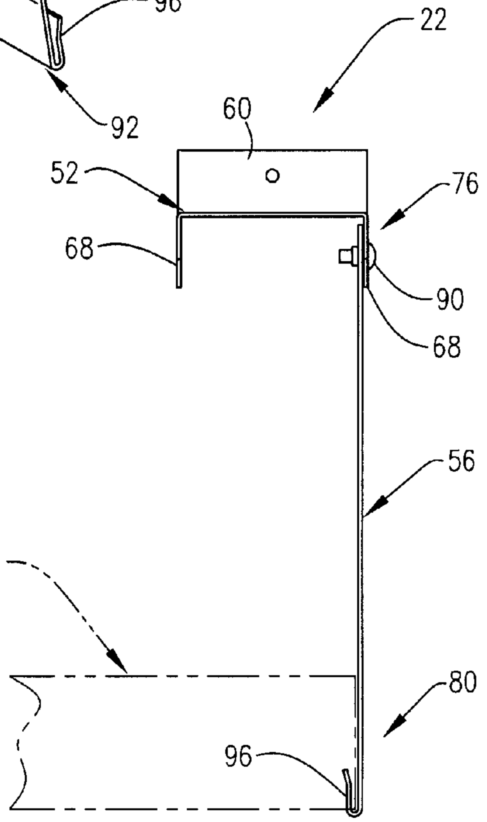
FIG. 5 is an elevation view of the self-leveling bracket.
Figure 5:
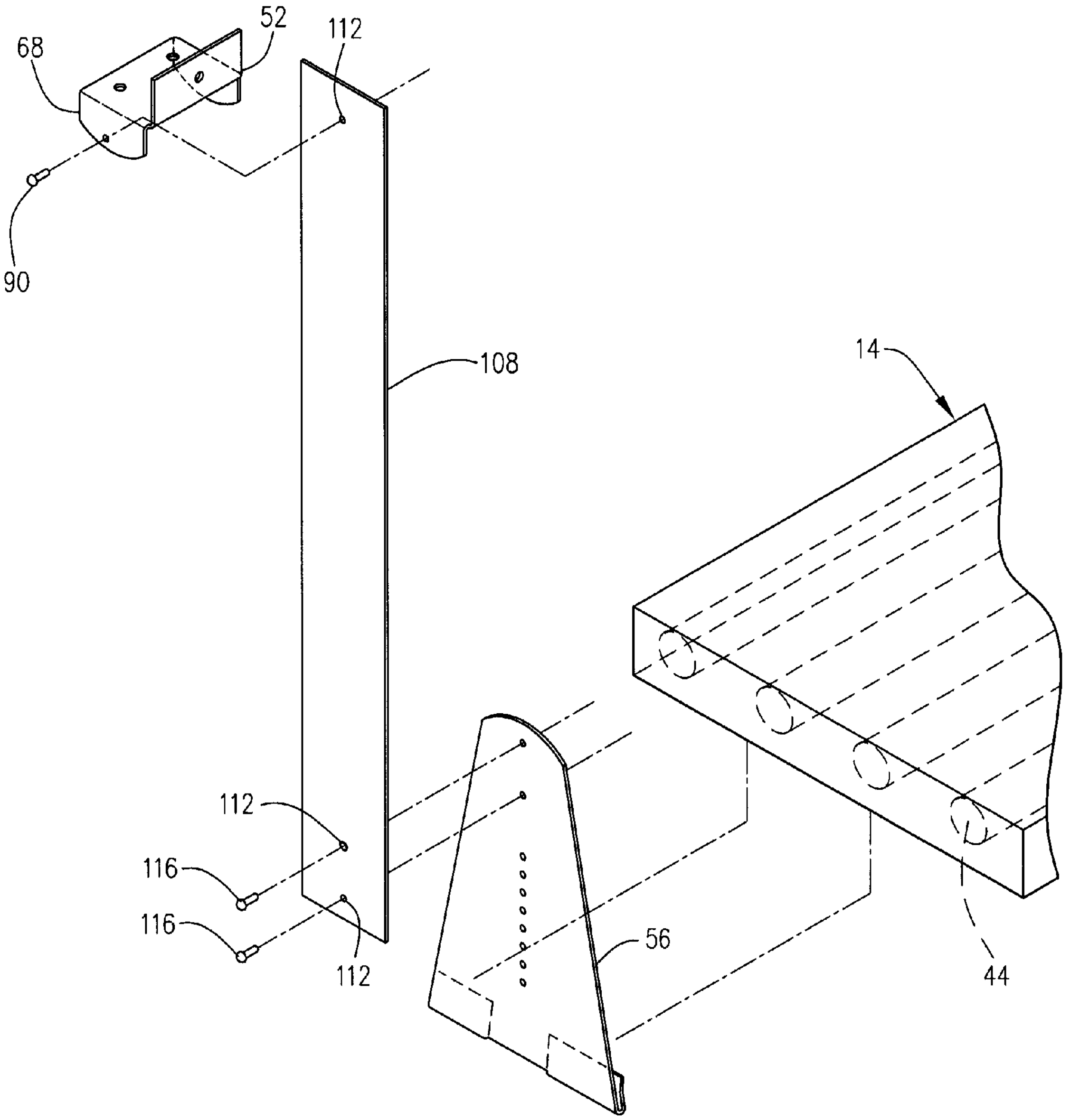

Referring now to FIGS. 3-5, the bracket 22 includes a connector member 52 and a hangar 56. It will be understood that each bracket 22 includes a connector member 52 and a hangar 56. The connector member 52 is provided as a substantially L-shaped portion 60 constructed to conform to at least a portion of the support beam 24 of the ceiling 18 such that the L-shaped portion 60 may be connected to the support beam 24 of the ceiling 18 (see FIG. 1). Although the connector member 52 has been disclosed as being L-shaped, any number of other shapes and/or configurations, as well as sizes, which allow the connector member 52 to join with the support beam 24 of the ceiling 18 are likewise contemplated for use in accordance with the present invention. The L-shaped portion 60 is connectable to the support beam 24 via one or more fasteners 64 (also see FIG. 1), for example, threaded fasteners, nut and bolt fasteners, clips, adhesives, straps, rivets, concrete anchors, and/or combinations thereof.

The connector member 52 further includes at least one, but preferably two, downwardly extending flanges 68. It will be understood that the inclusion of two flanges 68 allows the connector member 52 to be used in both a right handed and left handed fashion, making the brackets 22 universal. The flanges 68 are provided to pivotally connect the connector member 52 to the hangar 56 as will be discussed in greater detail below.

In one embodiment, the hangar 56 includes a an elongated plate 72. The plate 72 includes a first end portion 76, a second end portion 80, and a length extending therebetween. The first end portion 76 is provided with a substantially rounded edge 88 which allows the hangar 56 to pivotally connect to one of the flanges 68 of the connection member 52 without interfering with the support beam 24 during rotation of the hangar 56. Although the hangar 56 has been shown as being A-shaped, any number of other shapes and/or configurations (e.g., rectangular, square, elliptical, or irregular) which would be known to one of ordinary skill in the art with the present disclosure before them are likewise contemplated for use in accordance with the present invention.

In one embodiment, the first end portion 76 of the hangar 56 is pivotally connected to the connector member 52 by a pin fastener 90. It will be understood that other types of connections and/or fasteners which allow the hangar 56 to pivot while being securely connected to the connector member 52, for example, rivets, a threaded fastener, a clip or the like are likewise contemplated for use in accordance with the present invention.

The second end portion 80 of the plate 72 includes one or more connectors 92 for securing a portion of the lighting fixture 14 to the hangar 56. In one embodiment, the one or more connectors 92 includes two upturned tabs 96 forming substantially V-shaped grooves for slidingly receiving at least a portion of one of the first and the second ends 36 and 40 of the rectangular frame 32 of the lighting fixture 14 such that one of the hangars 56 is connected to the first end 36 of the lighting fixture 14 and the other hangar 56 is connected to the second end 36 of the lighting fixture 14. Although the connectors 92 have been disclosed as being upturned tabs 96 forming substantially V-shaped grooves, any number of differently shaped tabs or components that function to join the rectangular frame 32 of the lighting fixture 14 to the hangars 56 are likewise contemplated for use in accordance with the present invention.

In one embodiment of the present invention, the hangar 56 includes one or more apertures 100 disposed longitudinally along the midline of the of the hangar 56. It will be understood that the apertures 100 may be located at any position along the plate 72. The apertures 100 are sized to receive a securement member 104 (see FIG. 1) therethrough to act as a stop to prevent the lighting fixture 14 from disassociating from the hangar 56. Examples of various securement members 104 include, but are not limited to, threaded members, pins, clips, rivets and the like. The securement member 104 is preferably inserted into an aperture 100 that is located above the top of the frame 32 of the lighting fixture 14 when the lighting fixture 14 is joined with the bracket 22 (see FIG. 1).

Referring now to FIG. 6, the bracket 22 may also include an extension member 108 for increasing the distance between the flanges 68 and the hangars 56. The extension member 108 may included any number of shapes and/or sizes, for example, in one embodiment, the extension member 108 to includes an elongated plate having apertures 112 fabricated into both ends of the plate. Each of the two lower apertures 112 (proximate the hangar 56) are fabricated to receive a fastener 116 therethrough for securing the hangar 56 to the extension member 108. Also, the extension member 108 is connected to one of the flanges 68 of the hangar 56 by the pin fastener 90 which allows the extension member 108 to pivot relative to the connector member similar to the pivotal connection of the hangar 56 as disclosed above. The extension member 108 allows the lighting fixture 14 to hang further down from the ceiling 18 and also provides a clearance between the ceiling 18 and the lighting fixture 14 to facilitate maintenance on the lighting fixture 14.

To install the lighting fixture 14 using the bracket assembly 10, each of the brackets 22 is secured to the support beam 24 of the ceiling spaced apart from one another. More specifically, the brackets 22 are spaced apart a distance substantially equal to the length of the frame 32 of the light fixture 14. The connector members 52 are connected to the support beam 24 by placing the connector member 52 in a mating relationship with the support beam 24 and attaching the connector members 52 with fasteners 64. With the brackets 22 secured to the support beam 24, the light fixture 14 is secured to each of the two brackets 22 by inserting the first end 36 of the frame 32 into the grooves of one of the hangars 56 of a first bracket 22 and inserting the second end 40 of the frame 32 into the grooves of the other hanger 56. To further secure the lighting fixture 14 to the brackets 22, securement members 104 are placed through one of the apertures 100 of each of the hangars 56 of each of the brackets 22 at a distance above the top of the frame 32 of the lighting fixture 14 (see FIG. 1). Due to the pivotal connection between the connector members 52 and the hangers 56, the light fixture 14 will move to a substantially level orientation.

In another embodiment, certain parts of the bracket assembly 10 disclosed above are fabricated integrally, or fixedly attached together with the rectangular frame 32 to produce a self-leveling lighting fixture. For example, the hangars 56 may be fabricated as integral parts of the rectangular frame 32 such that the connector members 52 may be installed by connecting the connector members 52 to the support beam 24 and the self-leveling lighting fixture is then rotatably connected to the connector members 52 by inserting pin fasteners through the first portion 76 of the hangars 56 and the flanges 56 of the connector members 52.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A self-leveling bracket assembly for suspending a lighting fixture from a ceiling of a structure, the lighting fixture comprising a frame having a first end and a second end, the self-leveling bracket assembly comprising:

two brackets, each bracket comprising:

a connector member connectable to the ceiling of the structure; and a hangar comprising a plate having a first end portion and an opposing second end portion, the first end portion of the plate pivotally connected to the connector member, the second end portion including one or more upturned tabs forming grooves for receiving one of the first end and the second end of the frame of the lighting fixture, the plate having one or more apertures positioned along the midline of the plate for receiving one or more securement members to prevent the lighting fixture from disassociating from the plate when the plate is joined to the lighting fixture, wherein the self-leveling bracket assembly when connected to the lighting fixture and the ceiling allows the lighting fixture to self-level.

2. The self-leveling bracket of claim 1, wherein the connector members include an L-shaped portion constructed to substantially conform to at least a portion of a support beam of the ceiling.

3. The self-leveling bracket of claim 1, wherein the connector members include one or more downwardly extending flanges, and wherein the hangar is pivotally connected to one of the one or more downwardly extending flanges.

4. The self-leveling bracket of claim 1 further comprising an extension member having one end pivotally connected to the connector member and another end fixedly attached to the first end portion of the plates.

5. A self-leveling lighting fixture, comprising:

a frame member supporting one or more fluorescent tubes, the frame member having first and second ends spaced apart from one another to define a length;

a first bracket connected to and extending from the first end of the frame member; and a second bracket connected to and extending from the second end of the frame member, wherein each of the first and second brackets comprises:

a connector member connectable to the ceiling of a structure; and a hangar comprising a plate having a first end portion and an opposing second end portion, the second end portion being connected to the frame member and the first end portion being pivotally connected to the connector member in such a way that the frame member is able to self-level when the connector members are connected to the ceiling, the plate having one or more apertures positioned along the midline of the plate for receiving one or more securement members to prevent the lighting fixture from disassociating from the plate when the plate is joined to the lighting fixture.

6. The self-leveling lighting fixture of claim 5, wherein the connector members include an L-shaped portion constructed to substantially conform to at least a portion of a support beam of the ceiling.

7. The self-leveling bracket of claim 5, wherein the connector members include one or more downwardly extending flanges, and wherein the hangar is pivotally connected to one of the one or more downwardly extending flanges.

8. The self-leveling lighting fixture of claim 5, wherein the second end portion of the plate includes one or more upturned tabs forming grooves for slidingly receiving at least a portion of one of the first and the second ends of the frame of the lighting fixture.

9. The self-leveling lighting fixture of claim 5, further comprising an extension member having one end pivotally connected to the connector member and another end fixedly attached to the first end portion of the plate.

10. A method of suspending a light fixture from a ceiling of a structure wherein the light fixture includes a rectangular frame having a first end and a second end, the method comprising:

attaching two brackets to the ceiling so that the brackets are spaced apart a distance substantially equal to the length of the rectangular frame, each of the brackets comprising:

a connector member connectable to the ceiling of the structure; and a hangar comprising a plate extending downwardly from the connecter member and having a first end portion pivotally connected to the connector member and an opposing second end portion having a groove for slidingly receiving one of the first and second ends of the frame;

sliding the first end of the frame into the groove of the first bracket and sliding the second end of the frame into the groove of the second bracket;

inserting a securement member through each of the plates a distance above the frame so as to secure the frame in the grooves of the first and second brackets; and allowing the light fixture to self-level.

11. The method of claim 10 wherein the ceiling of the structure further includes a support beam, wherein the connector members of the first and second brackets include an L-shaped portion, and wherein the method further comprises attaching each of the connector members to the support beams so that the L-shaped portion substantially conforms to a portion of the support beam.

12. The method of claim 11 wherein the L-shaped portion is angularly disposed when connected to the support beam.

13. The method of claim 10 further comprises the step of suspending the frame of the light fixture lower by installing an extension member between the connector member and the plate of the first and second brackets, wherein one end of the extension member is pivotally connected to the connector member and another end is fixedly attached to the first end portion of the plate.

14. A bracket assembly for suspending a lighting fixture from a ceiling of a structure, the lighting fixture comprising a frame having a first end and a second end, the bracket assembly comprising:

two brackets, each bracket comprising:

a connector member connectable to the ceiling of the structure;

a hangar comprising a plate having a first end portion and an opposing second end portion, the first end portion of the plate pivotally connected to the connector member, the second end portion including at least one upturned tab forming at least one groove for receiving one of the first end and the second end of the frame of the lighting fixture, the plate having one or more apertures extending through the plate and arranged in such a way that at least one aperture is positioned above the frame of the lighting fixture when the frame of the lighting fixture is inserted into the groove of the plate; and a plurality of securement members insertable through the apertures of the plates to secure the frame in the groove of each of the plates.

15. A lighting fixture, comprising:

a frame supporting one or more fluorescent tubes, the frame having a first end and a second end spaced apart from one another to define a length;

a first bracket, comprising:

a first connector member connectable to the ceiling of a structure; and a first hangar comprising a first plate having a first end portion and an opposing second end portion, the first end portion of the first plate pivotally connected to the first connector member, the second end portion of the first plate including at least one upturned tab forming at least one groove in which the first end of the frame is positioned, the first plate of the first bracket having one or more apertures extending through the first plate, the one or more apertures arranged in such a way that at least one aperture is positioned above the first end of the frame of the lighting fixture; and a first securement member inserted through the aperture positioned above the first end of the frame of the lighting fixture so as to secure the first end of the frame of the lighting fixture in the groove of the first plate; and a second bracket, comprising:

a second connector member connectable to the ceiling of a structure; and a second hangar comprising a second plate having a first end portion and an opposing second end portion, the first end portion of the second plate pivotally connected to the second connector member, the second end portion of the second plate including at least one upturned tabs forming at least one groove in which the second end of the frame is positioned, the second plate of the second bracket having one or more apertures extending through the plate, the one or more apertures of the second plate arranged in such a way that at least one aperture is positioned above the second end of the frame of the lighting fixture; and a second securement member inserted through the aperture positioned above the second end of the frame of the lighting fixture so as to secure the second end of the frame of the lighting fixture in the groove of the second plate.

* * * * *